(12) United States Patent
Hessedenz

(10) Patent No.: US 7,720,725 B2
(45) Date of Patent: May 18, 2010

(54) SYSTEMS AND METHODS FOR PLANNING A SUPPLY NETWORK IN A MANAGED SUPPLY CHAIN

(75) Inventor: Hans-Juergen Hessedenz, Saarwellingen (DE)

(73) Assignee: SAP AG, Walldorf (DE)

( * ) Notice: Subject to any disclaimer, the term of this patent is extended or adjusted under 35 U.S.C. 154(b) by 1329 days.

(21) Appl. No.: 11/013,375

(22) Filed: Dec. 17, 2004

(65) Prior Publication Data
US 2005/0216372 A1 Sep. 29, 2005

(30) Foreign Application Priority Data
Dec. 19, 2003 (EP) .................. 03079131

(51) Int. Cl.
*G06Q 10/00* (2006.01)
(52) U.S. Cl. ...................................... 705/28
(58) Field of Classification Search ............... 705/1, 705/22, 28
See application file for complete search history.

(56) References Cited

U.S. PATENT DOCUMENTS

| | | | |
|---|---|---|---|
| 6,879,962 B1* | 4/2005 | Smith et al. | 705/22 |
| 6,889,197 B2* | 5/2005 | Lidow | 705/10 |
| 6,915,268 B2* | 7/2005 | Riggs et al. | 705/7 |
| 7,003,474 B2* | 2/2006 | Lidow | 705/7 |
| 7,136,830 B1* | 11/2006 | Kuelbs et al. | 705/27 |
| 7,206,757 B2* | 4/2007 | Seigel et al. | 705/26 |
| 2005/0165629 A1* | 7/2005 | Bruns | 705/6 |
| 2005/0216372 A1* | 9/2005 | Hessedenz | 705/28 |

OTHER PUBLICATIONS

Polypropylene Market Flooded by Imported Products Amidst Recovery of Demand. Indonesian Commercial Newsletter, v 28, n 316, p. 9 May 22, 2001.*

* cited by examiner

*Primary Examiner*—Matthew S Gart
*Assistant Examiner*—Oluseye Iwarere
(74) *Attorney, Agent, or Firm*—Finnegan, Henderson, Farabow, Garrett & Dunner L.L.P.

(57) ABSTRACT

Systems and methods are disclosed for planning a supply network for a product between a source location and a destination location in a managed supply chain. In one embodiment, a method is provided that comprises the steps of: creating a planned stock transfer order to cover demand from the destination location, deploying available products from the source location to the destination location in response to the planned stock transfer, the deploying step including the step of calculating a quantity of products available to deploy, wherein the calculating step takes into account a rounding value and a maximum lot size, and confirming the planned stock transfer order with the calculated available quantity.

22 Claims, 8 Drawing Sheets

| BUCKET<br>DESTINATION LOCATION | 1 | 2 | 3 | 4 | ... | n |
|---|---|---|---|---|---|---|
| DC01 | ROUNDING VALUE, MAXIMUM LOT SIZE AND MEANS OF TRANSPORT (DC01, BUCKET 1) | ROUNDING VALUE, MAXIMUM LOT SIZE AND MEANS OF TRANSPORT (DC01, BUCKET 2) | ROUNDING VALUE, MAXIMUM LOT SIZE AND MEANS OF TRANSPORT (DC01, BUCKET 3) | ROUNDING VALUE, MAXIMUM LOT SIZE AND MEANS OF TRANSPORT (DC01, BUCKET 4) | | ROUNDING VALUE, MAXIMUM LOT SIZE AND MEANS OF TRANSPORT (DC01, BUCKET n) |
| DC02 | ROUNDING VALUE, MAXIMUM LOT SIZE AND MEANS OF TRANSPORT (DC02, BUCKET 1) | ROUNDING VALUE, MAXIMUM LOT SIZE AND MEANS OF TRANSPORT (DC02, BUCKET 2) | ROUNDING VALUE, MAXIMUM LOT SIZE AND MEANS OF TRANSPORT (DC02, BUCKET 3) | ROUNDING VALUE, MAXIMUM LOT SIZE AND MEANS OF TRANSPORT (DC02, BUCKET 4) | | ROUNDING VALUE, MAXIMUM LOT SIZE AND MEANS OF TRANSPORT (DC02, BUCKET n) |

FIG. 8

SYSTEMS AND METHODS FOR PLANNING A SUPPLY NETWORK IN A MANAGED SUPPLY CHAIN

BACKGROUND OF THE INVENTION

I. Field of the Invention

The present invention generally relates to computerized planning systems and methods. More particularly, the invention relates to systems and methods for planning a supply network in a managed supply chain.

II. Background Information

Supply network planning is used to calculate quantities of products to be delivered to destination locations to match customer demand and maintain a desired service level. Within supply network planning, a deployment application is often provided which calculates the quantity of products available to deploy from source locations.

It has been found that supply network planning suffers from several drawbacks. One problem is that conventional deployment applications consider rounding values only in a fair share situation. If there is sufficient available to deploy (ATD) quantity to cover all demands, the system assumes that the supply network planner has already rounded stock transfer quantities. Further, the maximum lot size is not taken into consideration at all. This situation can lead to one or more errors. For example, conventional deployment applications consider manually created supply network planning stock transfer orders without rounding. Further, in some cases, deployment changes the means of transport used by the supply network planning. As a result, the rounding profile also changes and deployment confirms quantities rounded for another, different, means of transport.

A further problem with conventional deployment applications is that it uses the means of transport that is valid on the deployment start date for the entire planning period. This may lead to one or more problems. For example, conventional deployment applications may use a means of transport outside its validity period. Further, conventional deployment applications do not consider supply network planning stock transfers created using a means of transport that is not valid on the start date, but is valid on later dates within the planning period.

In view of the foregoing, it is an object of the present invention to address these and other problems encountered in conventional supply network planning incorporating a deployment.

SUMMARY OF THE INVENTION

Consistent with embodiments of the present invention, computerized systems and methods are disclosed for planning a supply network in a managed supply chain.

According to one embodiment, a method is provided for planning a supply network for a product between a source location and a destination location in a managed supply chain. As disclosed herein, the method may comprise the steps of: creating a planned stock transfer order to cover demand from the destination location; deploying available products from the source location to the destination location in response to the planned stock transfer, the deploying step including the step of: calculating a quantity of products available to deploy, wherein the calculating step takes into account at least one of a rounding value and a maximum lot size; and confirming the planned stock transfer order with the calculated available quantity. In this way, by taking into account a rounding value or a maximum lot size, it is ensured that an incorrect or inappropriate means of transport is not selected. This results in a more efficient use of the means of transport, which leads to an overall improvement in the efficiency of the supply network planning.

According to another embodiment of the present invention, there is provided a supply network planner for planning a supply network for a product between a source location and a destination location in a managed supply chain. The supply network planner may be operatively associated with a user interface for receiving input. Further, the supply network planner may comprise: a storage medium having recorded therein processor readable code processable to plan a supply network for a product between a source location and a destination location in a managed supply chain, the code comprising creating code processable to create a planned stock transfer order to cover demand from the destination location, deploying code processable to deploy available products from the source location to the destination location in response to the planned stock transfer, the deploying code including calculating code processable to calculate a quantity of products available to deploy, wherein the calculating code is processable to take into account at least one of a rounding value and a maximum lot size, and confirming code processable to confirm the planned stock transfer order with the calculated available quantity.

In accordance with a further embodiment of invention, there is provided a user terminal comprising means operable to perform one or more steps of methods consistent with embodiments of the present invention.

According to still another embodiment of the present invention, there is provided a program storage device readable by a processing apparatus or processor, the device embodying a program of instructions executable by the processor to perform one or more steps of methods consistent with the present invention.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

In the following description, certain expressions are used, which are known to those skilled in the art of supply network planning and supply chain management.

A supply network planner typically includes three stages, which are typically implemented with three applications: a supply network planner (SNP) application; a deployment application; and a transport load builder (TLB) application. The SNP deployment and transport load builder applications may be based on a heuristics approach. In particular, in a planning function in Production Planning and Detailed Scheduling (PP/DS), a heuristic may be used for solving planning problems for selected objects (e.g., products, orders resources or line networks). Depending on the planning focus, a heuristic can run procurement planning for products, or sequencing for orders on resources. To solve problems, the heuristic uses rules that have been determined by experience or intuition. In contrast to optimization, a heuristic does not aim to find an optimum solution by minimizing an objective function, but rather deals with specific planning problems by using a rules-based approach. This approach allows very extensive problems (e.g., planning several hundred products) to be processed within a short amount of time.

In the following description, reference is made to products. However, supply network planners and methods consistent with the present invention have application to all manner of products, assemblies, subassemblies, items, etc., including finished and semi-finished products.

Figure 1:
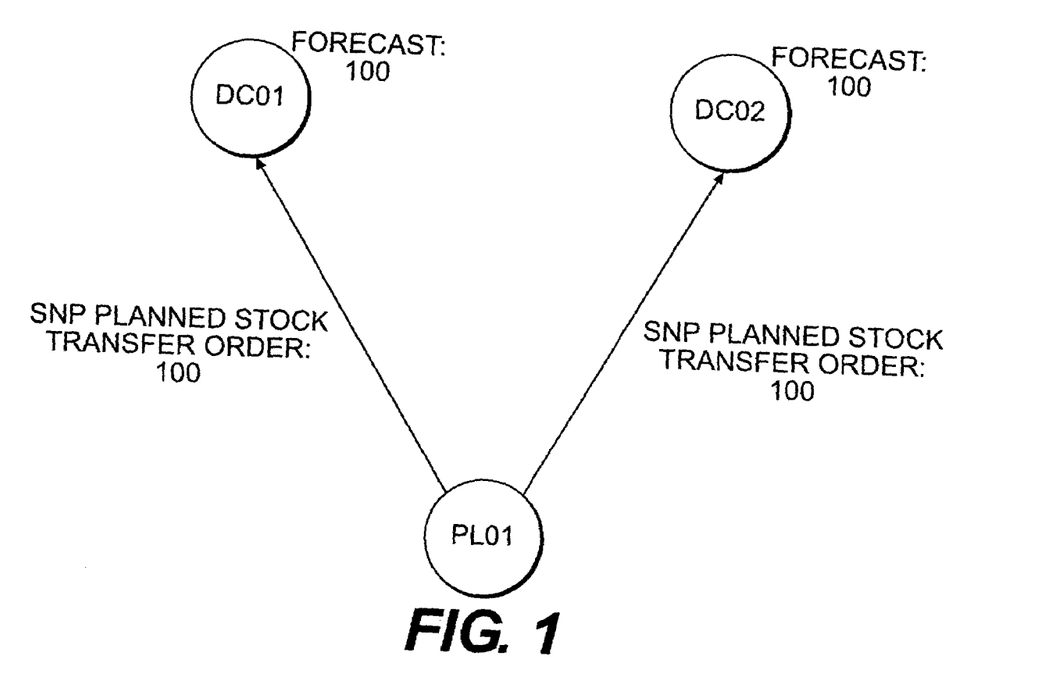
FIG. 1 illustrates an exemplary supply network planner application.

FIG. 1 illustrates an exemplary supply network planner application. The supply network planner creates planned production orders or planned stock transfer orders to cover demands. For example, for each distribution center DC01 and DC02 a demand of 100 products exists. On the basis of this demand, the supply network planner creates stock transfer orders with plant PL01 as the source location to cover the demand. It is noted that the source location is the location from which items are to be deployed and the destination location is the location to which the items are to be deployed. In the example shown in FIG. 1, the distribution centers are the destination locations because they are to receive the items. The source location, in this example, is the plant PL01.

Figure 2:
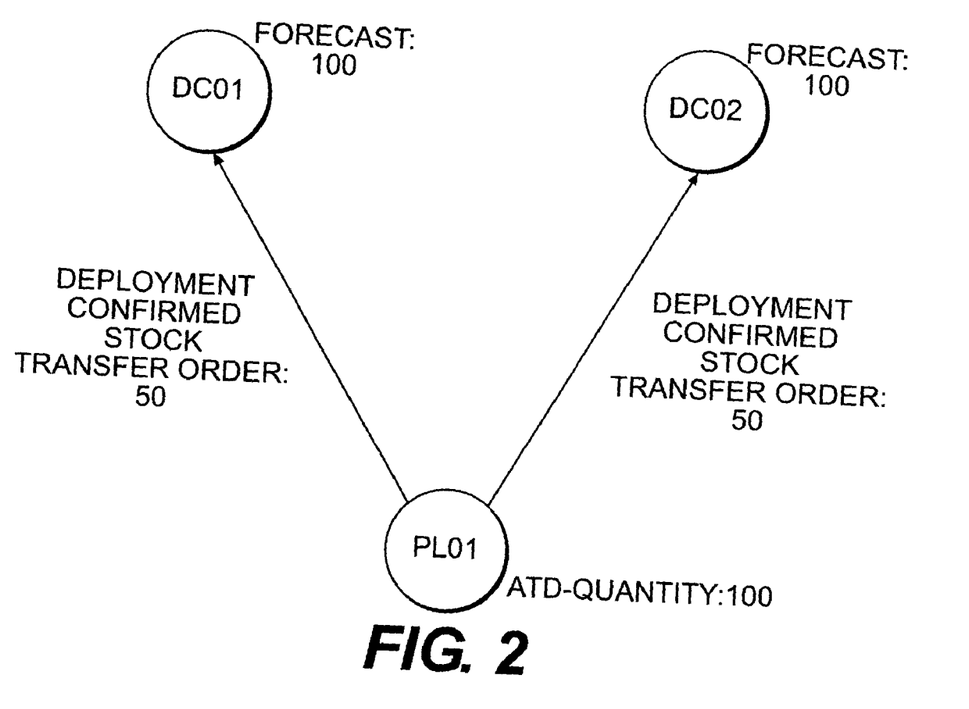
FIG. 2 illustrates an exemplary deployment application.

FIG. 2 illustrates an exemplary deployment application. The deployment application may calculate the quantity of products, or the like, available to deploy from the source location. This may be carried out for every bucket. The deployment application may also check if it is possible to confirm the SNP planned stock transfer orders with the available quantity. For example, if, as shown in FIG. 1 two SNP planned orders of 100 exist, the first from PL01 to DC01 and the second from PL01 to DC02. If, for example, an available to deploy (ATD) quantity of 100 is calculated to exist, then the deployment application cannot confirm the two planned stock transfers in their entireties. In this situation, the deployment application may carry out a fair share distribution between the two demands; that is, proportionally to the planned distribution demands. In the example shown in FIG. 2, the deployment confirms a stock transfer order of 50 from PL01 to DC01 and a stock transfer order of 50 from PL01 to DC02.

Figure 3:
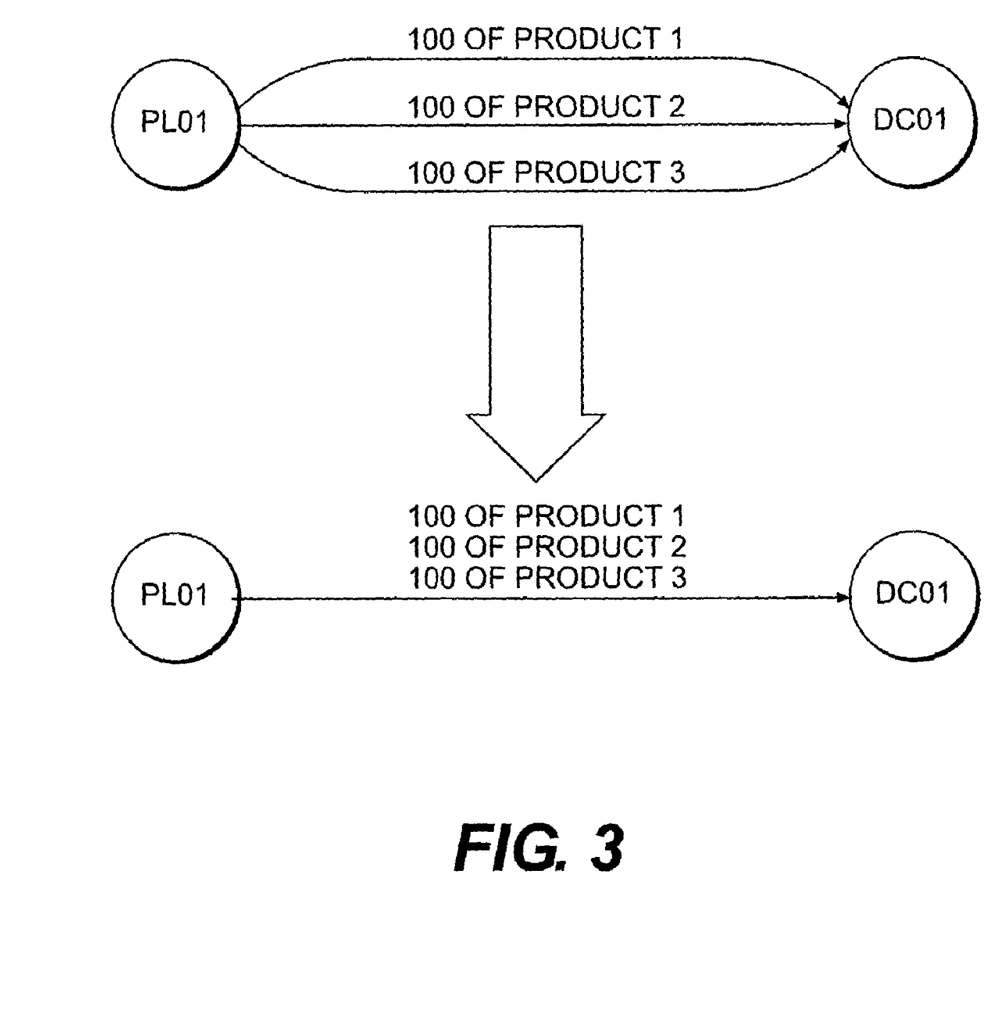
FIG. 3 illustrates an exemplary transport load builder application.

FIG. 3 illustrates an exemplary transport load builder application. The transport load builder may combine several deployment confirmed stock transfer orders of several products, or the like, to the same transport load, such as a truck load. For example, if three products exists on a source as well as on a destination deployment and a confirmed stock transfer order exists for each product, the TLB will attempt to create one transport with a position for every product. For example, if a confirmed stock transfer order for 100 of products 1, 2 and 3 exists, respectively, then the TLB may create a single transport from PL01 to DC01 which accommodates all three products.

Figure 4:
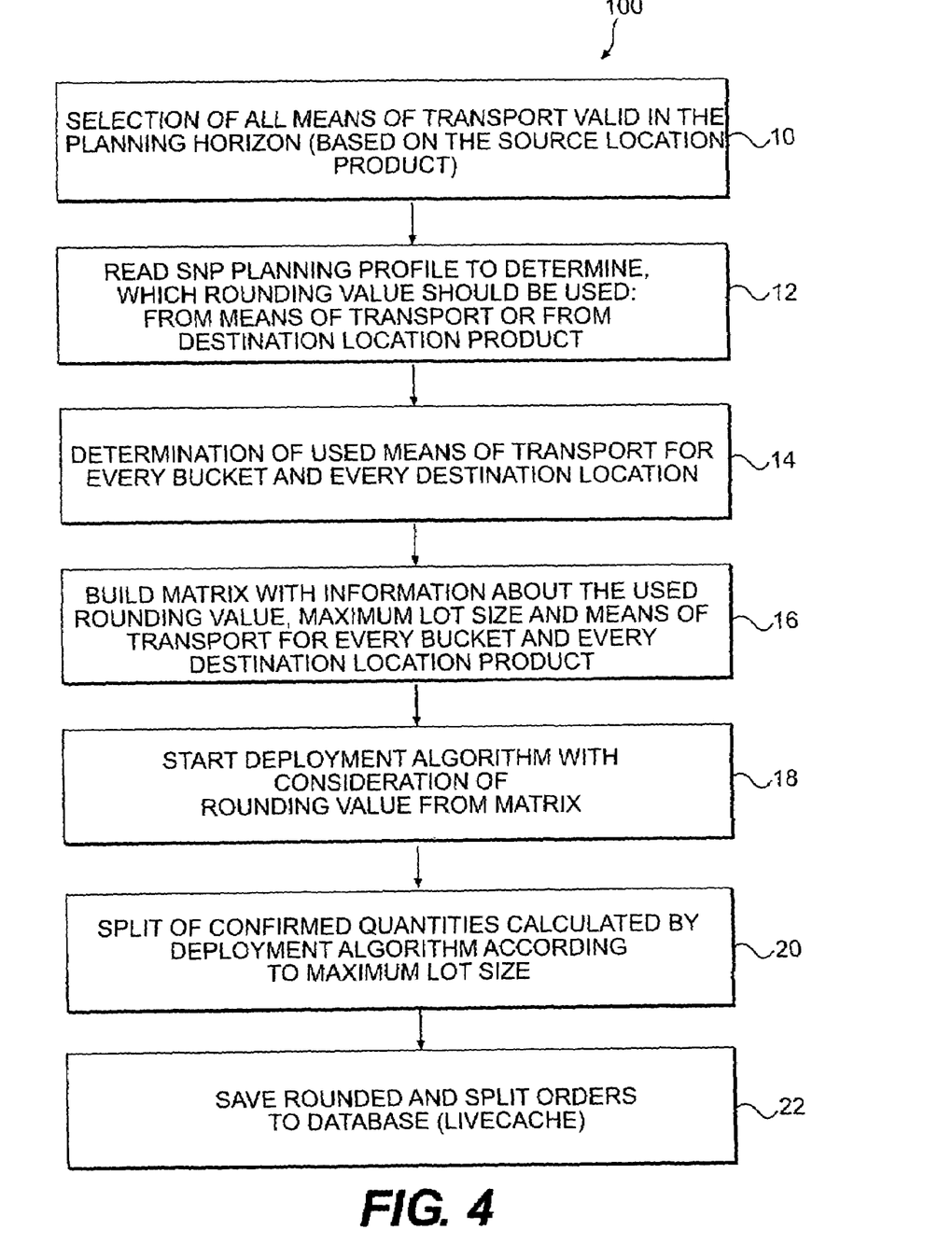
FIG. 4 shows a flow chart of an exemplary method for supply network planning, in accordance with an embodiment of the present invention.

FIG. 4 illustrates a flow chart of an exemplary method for supply network planning, in accordance with an embodiment of the present invention. As can be seen in FIG. 4, a process 100 is shown including the steps of: selecting all of the means of transport valid in the planning horizon (step 10). This selection may be based on the source location product. Subsequently, the SNP planning profile is read to determine which rounding value should be used (step 12). This may be determined either from the means of transport or from the destination location product.

The destination location product is the product to be deployed to the destination location. The means of transport may be any form of transport and includes, for example, road, rail, air, sea or other transport means. The rounding value defines the manner of shipping of the product, for example, the rounding value may define that a certain product should only be shipped in multiples of 100. In addition to the rounding value being dependent on the product, it is also dependent on the destination location and the means of transport.

Figure 6:
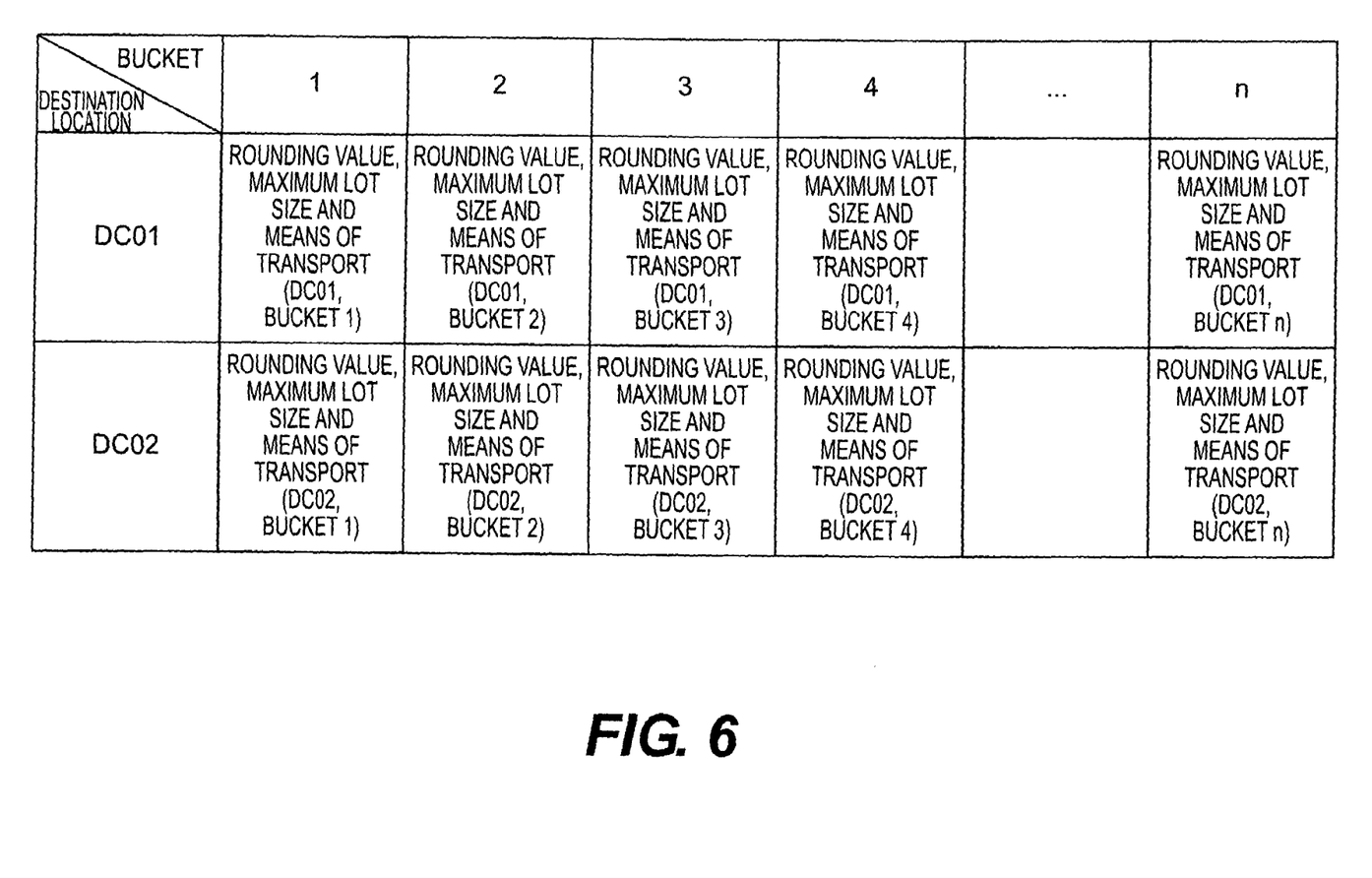
FIG. 6 illustrates a example of a matrix for deployment calculation of confirmed quantities, in accordance with an embodiment of the present invention.

Referring again to FIG. 4, a further step is to determine the used means of transport for every bucket and every destination location (step 14). A "bucket" is a term used in supply network planning and refers to a planned batch for inclusion in a shipment. FIG. 6, for example, illustrates a plurality of buckets. Typically, a bucket is provided for a certain time period, "time bucket". A matrix may be built, including information about the used rounding value, the maximum lot size and means of transport for every bucket and every destination location product (step 16). Having built-up the matrix, the deployment application including a deployment algorithm is started which takes into consideration the rounding value from the matrix (step 18). In a further step, the deployment application in accordance with the deployment algorithm splits the confirmed quantities calculated by the deployment algorithm according to a maximum lot size (step 20). The maximum lot size specifies the quantity of a product, which a stock transfer order can contain. Finally, the rounded and split order are saved to a database, such as an object-oriented database, for example, a LiveCache (step 22).

Figure 5:
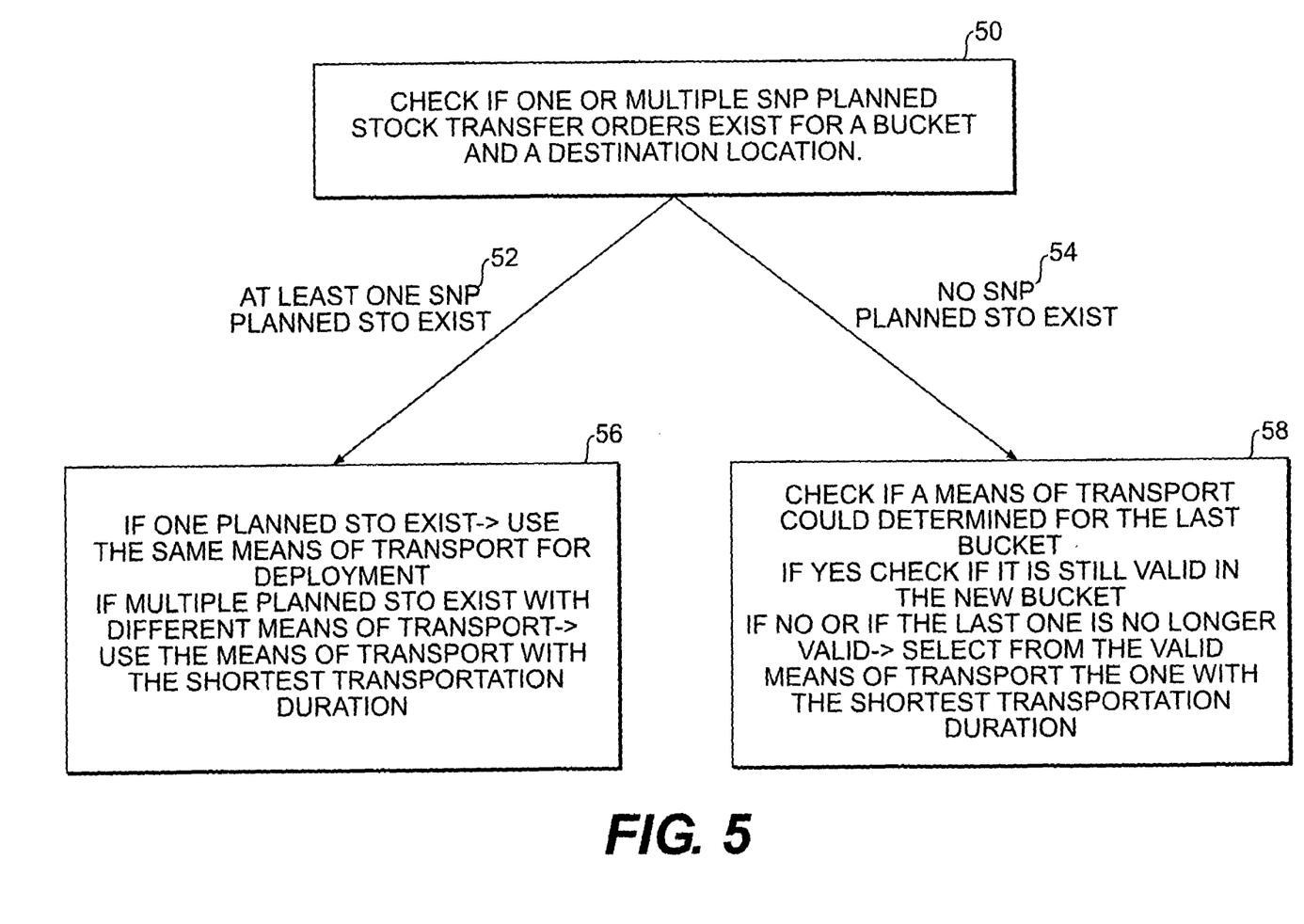
FIG. 5 shows an example of a determination of the means of transport, in accordance with an embodiment of the present invention.

FIG. 5 shows an exemplary determination of the means of transport, in accordance with an embodiment of the present invention. For every destination location product and every bucket, the means of transport to be used may be determined. This may take place before the start of the deployment algorithm. Consistent with the present invention, an exemplary determination is shown in FIG. 5.

As shown in the example of FIG. 5, the first step is to check if one or multiple SNP planned stock transfer orders (STO) exist for a bucket and a destination location (step 50). If it is determined that at least one SNP planned STO exists (step 52), then the same means of transport is used for the deployment. If it is determined that multiple planned STO exist with different means of transport, then the means of transport is used with the shortest transportation duration (step 56). If it is determined that no SNP planned STO exists (step 54), then it is checked whether a means of transport could be determined for the previous (last) bucket. If the answer is "Yes", then a check is made to see if it is still valid for the new bucket. If the answer is "No" or if the means of transport from the previous bucket is no longer valid, then the means of transport with the shortest transportation duration is used (step 58).

FIG. 6 illustrates an exemplary matrix for deployment calculation of confirmed quantities, in accordance with an embodiment of the present invention. Consistent with embodiments of the invention, a matrix may be drawn-up for the deployment calculation of confirmed quantities. By way of example, the matrix may contain data for every bucket 1, 2, 3, 4 ... n and every destination location DC01 and DC02. The data contained may include the rounding value and maximum lot size and which means of transports should be used by deployment.

In accordance with one embodiment of the present invention, there is provided a method for planning a supply network for a product between a source location and a destination location in a managed supply chain, wherein the method comprises the steps of: creating a planned stock transfer order to cover demand from the destination location; deploying available products from the source location to the destination location in response to the planned stock transfer, the deploying step including the step of: calculating a quantity of products available to deploy, wherein the calculating step takes into account at least one of a rounding value and a maximum lot size; and confirming the planned stock transfer order with the calculated available quantity. In this way, by taking into account a rounding value or a maximum lot size, it is ensured that an incorrect or inappropriate means of transport is not selected. This results in a more efficient use of the means of transport, which leads to an overall improvement in the efficiency of the supply network planning.

In a further embodiment of the invention, the deploying step includes the further step of considering the period of validity of a means of transport for deploying the available products from the source location to the destination location. In this way, means of transport which are not valid on the start date, but nevertheless valid during the time period, are taken into account. This can lead to a further improvement in the efficiency of use of the means of transportation and, thus, further improve the efficiency of the supply network planning.

In yet another embodiment, the calculated quantity is deployed as a plurality of buckets, wherein the deploying step includes the further step of determining a valid means of transport for each bucket and destination location taking into account the planned stock transfer order. In this way, every destination location is taken into account in the deployment to obtain a more accurate idea of the planned demand.

In another embodiment, the deploying step includes the further step of determining a valid means of transport in accordance with the validity of the means of transport and the transportation duration. By taking into account the transportation duration, the most efficient means of transport can be selected. As a result, this approach can lead to further improvements in overall efficiency.

In still a further embodiment of the invention, the creating step takes into account a planning profile. A planning profile may include parameters defining the planning to be carried out.

In another embodiment, the deploying step takes into account a rounding profile defining the rounding value. The planning profile may include a parameter to determine which rounding value the rounding profile takes. By including a parameter in the planning profile determining which rounding value the rounding profile takes, an improved efficiency and accuracy in the planning can be achieved.

In accordance with a further embodiment, the deployment step includes the further step of determining for each bucket and each destination location whether a planned stock transfer order exists. If the answer is "Yes", the validity of the means of transport being used is checked. The check may also be used for deployment of the stock transfer. If there are several SNP stock transfers using different means of transport for the same bucket, the means of transport may be used with the shortest transportation duration, as described with reference to FIG. 5. If the answer is "No", a check is made to see if a valid means of transport exists and, if one does, the means of transport with the shortest transportation duration may be used.

In a further embodiment, if no valid means of transport exists for a bucket and a destination location, the deployment step may include the further step of rolling forward demands for confirmation to a next bucket. By doing so, buckets are dealt with as quickly and efficiently as possible.

In a further embodiment, the deployment step includes the further step of choosing at least one of the rounding value and the maximum lot size according to a setting or settings in the planning profile. Thus, the planning profile accurately defines the planning to achieve the most efficient results of the supply network planning.

In a yet further embodiment, the deployment step includes the further step of rounding down the rounding value even if the available to deploy quantity is sufficient. In this way, the rounding value does not create a situation where unfulfillable demands are placed on the supply network planning.

In a further embodiment, the deployment step includes the further step of determining the validity of a means of transport in accordance with the destination location. Further, the deployment step may include the further step of using a means of transport if it is valid on an availability date, regardless of whether it is valid on a starting date. In this way, all means of transport available over the entire transportation period are taken into account.

Figure 7:
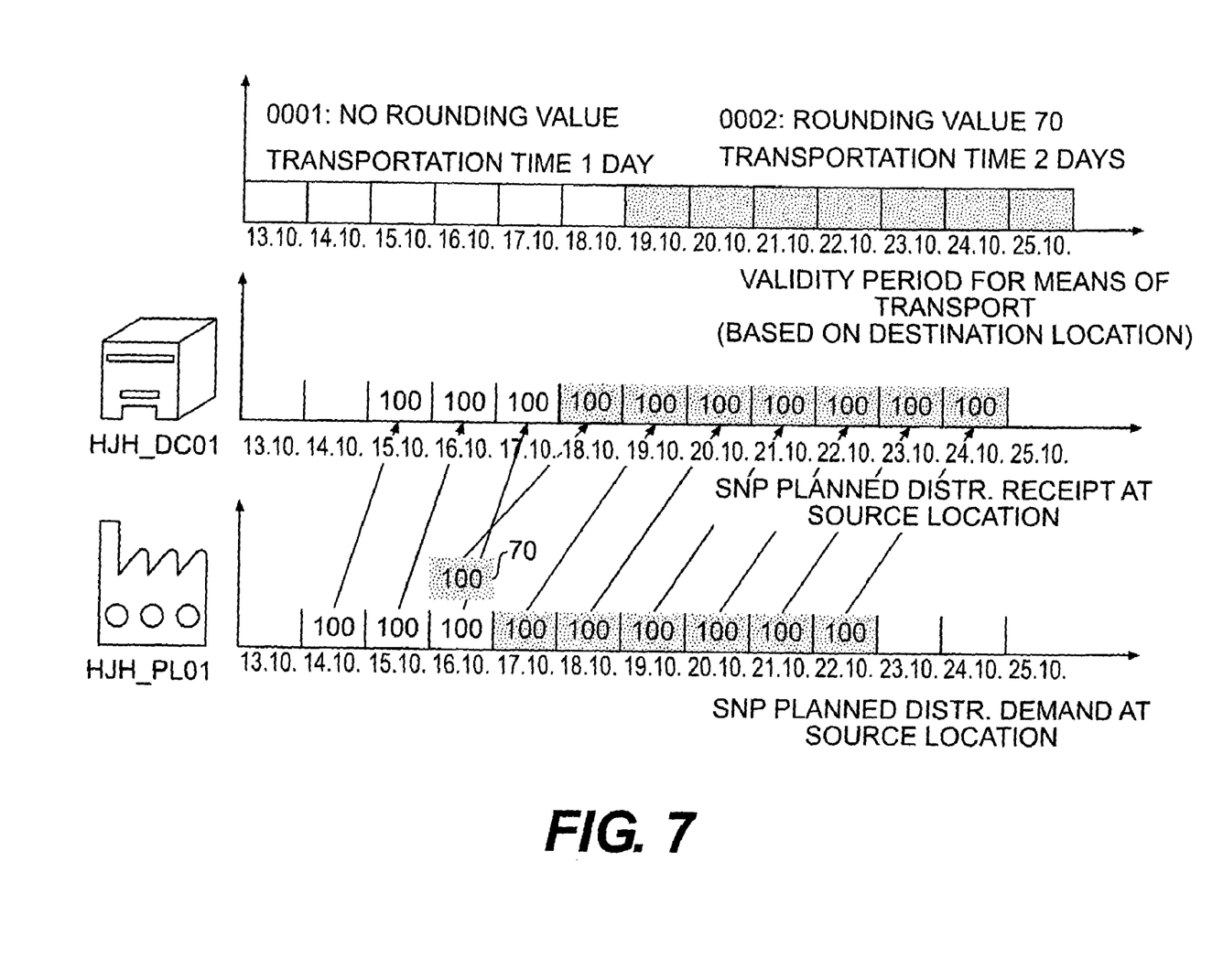
FIG. 7 illustrates an exemplary embodiment consistent with the present invention.

FIG. 7 illustrates an exemplary embodiment consistent with the present invention. In the example shown, the source location is HJH_PL01, the destination location is HJH_DC01, and the rounding value for the destination location product is 65. The maximum lot size for the destination location product is 130. The means of transport 0001 is valid until Oct. 18, 2003 and the means of transport 0002 is valid from the Oct. 19, 2003. The rounding value for the means of transport 0002 is 70. Means of transport 0001 has no rounding value. As can be seen from FIG. 7, on Oct. 16, 2003, even though means of transport 0002 is not yet valid, the supply network planner considers it for a subsequent transport 70.

Figure 8:
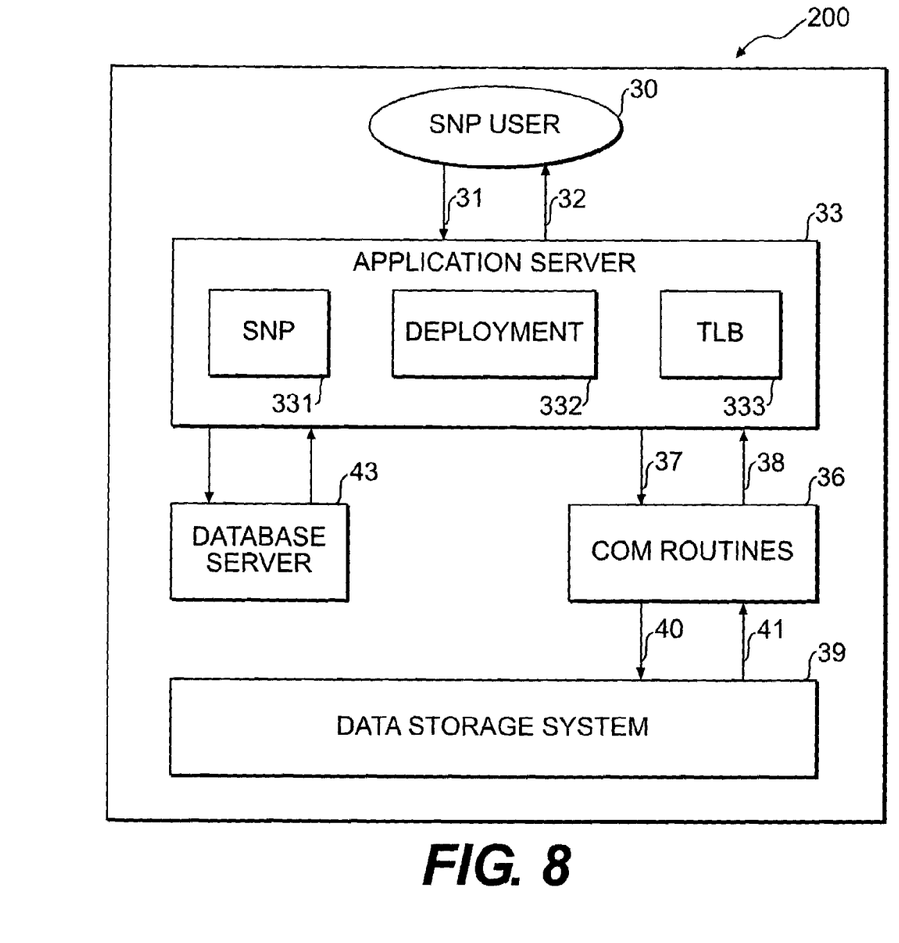
FIG. 8 shows an exemplary system architecture, in accordance with an embodiment of the present invention.

FIG. 8 shows an exemplary system architecture, in accordance with an embodiment of the present invention. In particular, FIG. 8 illustrates a system 200 in which methods consistent with the present invention may be implemented, such as the data flow and data processing steps initiated by a demand planning apparatus or carried by methods consistent with the present invention.

Referring to FIG. 8, the system 200 includes a supply network planning user 30, which is a graphic user interface (GUI) with which a user interacts. The user may make a request or input data 31 to an application server 33. For example, the user inputs a first initial value, at least one second initial value and changed values, if and when desired. Having provided data and/or a request, the user receives an output in the form of a delivery of data 32 from the application server 33. The application server 33 may run the application logic which carries out the demand planning.

The system 200 may further include a programming system 36 for running Common Object Model (COM) routines and defining a network programming system. The COM routines may receive a request or an input of data 37 from the application server 33. Furthermore, the COM routines deliver data 38 to the application server 33. In one embodiment, the function of the COM routines is to carry out data transformation and data calculation.

The COM routines may be further in association with a data storage system 39, such as an object-oriented database, for example, a LiveCache. The COM routines may send a request or an input of data 40 to the data storage system 39. Also, the data storage system 39 may deliver data 41 to the COM routines, as shown in FIG. 8.

Returning to the application server 33 and the example of FIG. 8, in one embodiment of the present invention, a supply network planner is provided for planning a supply network for a product between a source location and a destination location in a managed supply chain, wherein the supply network planner is operatively associated with a user interface for receiving an input. The supply network planner may comprise a storage medium having recorded therein processor readable code processable to plan a supply network for a product between a source location and a destination location in a managed supply chain, the code comprising: creating code processable to create a planned stock transfer order to cover demand from the destination location; deploying code processable to deploy available products from the source location to the destination location in response to the planned stock transfer, the deploying code including calculating code processable to calculate a quantity of products available to deploy, wherein the calculating code is processable to take into account at least one of a rounding value and a maximum lot size; and confirming code processable to confirm the planned stock transfer order with the calculated available quantity.

In one embodiment, the application logic is written in Advanced Business Application Programming (ABAP), a programming language developed by SAP AP (Walldorf, Germany) for application development. However, embodiments the invention are not limited in this respect and other programming languages are also suitable depending on the particular application embodiments of the present invention are incorporated into.

Referring again to FIG. 8, the application server 33 may comprise a plurality of applications 331, 332, 333 that are adapted to carry out data processing. The first application 331 may be adapted to carry out the supply network planning. Further, the second application 332 may be adapted to carry out the deployment and the third application may be adapted to carry out the transport load build (TLB). The application server 33 also includes means to perform request processing which is input by the demand planning user 30. At the request processing level, the user request may be processed without processing the actual data. Further, the applications 331, 332, 333 may be adapted to carry out the data processing.

It will be understood that depending on the other applications comprised in the system 200, the system may include a plurality of GUIs and applications. Further, while only one GUI and application are shown in FIG. 8, other GUIs and applications may also be comprised in the system.

In a supply network planning application, the internal logic for dealing with transactional data may be stored in a data storage system 39, for example, an object-oriented data storage system, such as LiveCache (LC). Further, the transactional data may be represented with three technical characteristics for profile, table, and row.

Embodiments of the invention can be implemented in digital electronic circuitry, or in computer hardware, firmware, software, or in any combination thereof. An apparatus consistent with the present invention can be implemented in a computer program product tangibly embodied in a machine readable storage device for execution by a programmable processor. Further, method steps consistent with the invention can be performed by a programmable processor executing a program or set of instructions to perform functions of the invention by operating on input data and generating output. Moreover, embodiments of the invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, embodiments of the invention can be implemented on a computer system having a display device, such as a monitor or LCD screen, for displaying information to the user and a keyboard and a pointing device, such as a mouse or a trackball, by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. For example, in the embodiments described certain products, characteristics and other parameters are referred to. The present invention is not limited to these particular products, characteristics or other parameters, and these are given by way of example only. Further, the present invention has broad application to the demand planning of any product, including configurable products. Moreover, although embodiments of the invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for planning a supply network in a managed supply chain, the method comprising:
creating, using a processor, a planned stock transfer order to cover demand from a destination location;
deploying, using the processor, available products from a source location to the destination location in response to the planned stock transfer order, the deploying step comprising calculating a quantity of products available to deploy based on a rounding value, the rounding value depending on one or more of the available products, the destination location, and a means of transport for deploying the available products; and
confirming, using the processor, the planned stock transfer order with the calculated available quantity,
wherein the deploying step further comprises:
determining the rounding value based on parameters associated with a rounding profile and a planning profile of the planned stock transfer order;
deploying the available products from the at least one source location to each destination location using a plurality of buckets; and
determining a valid means of transport for deploying the buckets;
and further wherein the calculating step comprises calculating the quantity of products available to deploy using the buckets.

2. The method of claim 1, wherein the deploying step further comprises:
considering a period of validity of the means of transport for deploying the buckets from the source location to the destination location.

3. The method of claim 1, wherein the determining step comprises:
determining the valid means of transport in accordance with a transportation duration.

4. The method of claim 1, wherein the creating step is performed at least in part on the basis of the planning profile.

5. The method of claim 1, wherein:
the rounding profile comprises a plurality of rounding values; and
the planning profile comprises a parameter identifying at least one of the rounding values of the rounding profile.

6. The method of claim 1, wherein the deploying step comprises:
determining, for the buckets and for the destination location, whether the planned stock transfer order exists.

7. The method of claim 6, wherein if no valid means of transport exists for a bucket and a destination location, the deploying step further comprises:
rolling forward demands for confirmation to a next bucket.

8. The method of claim 1, wherein determining the rounding value comprises:
choosing the rounding value according to at least one setting in the planning profile.

9. The method of claim 1, wherein the deploying step comprises:
rounding down the rounding value when the available to deploy quantity is sufficient.

10. The method of claim 1, wherein the deploying step further comprises:
determining a validity of the means of transport in accordance with the destination location.

11. The method of claim 1, wherein the deploying step further comprises:
using the means of transport when the means of transport is valid on an availability date.

12. A system for planning a supply network for a product in a managed supply chain, comprising:
a storage medium; and
a processor coupled to the storage medium, wherein the storage medium stores a program for controlling the processor, and wherein the processor, being operative with the program, is configured to:
create a planned stock transfer order to cover demand from a destination location;
deploy available products from a source location to the destination location in response to the planned stock transfer order and by calculating a quantity of products available to deploy based on a rounding value, the rounding value depending on one or more of the available products, the destination location, and a means of transport for deploying the available products; and
confirm the planned stock transfer order with the calculated available quantity,
wherein the deploying further comprises:
determining the rounding value based on parameters associated with a rounding profile and a planning profile of the planned stock transfer order;
deploying the available products from the at least one source location to each destination location using a plurality of buckets; and
determining a valid means of transport for deploying the buckets;
and further wherein the calculating comprises calculating the quantity of products available to deploy using the buckets.

13. A tangible program storage device comprising a set of instructions that, when executed on a processor, performs a method for planning a supply network for in a managed supply chain, the method comprising:
creating a planned stock transfer order to cover demand from a destination location;
deploying available products from a source location to the destination location in response to the planned stock transfer order, the deploying step comprising calculating a quantity of products available to deploy based on a rounding value, the rounding value depending on one or more of the available products, the destination location, and a means of transport for deploying the available products; and
confirming the planned stock transfer order with the calculated available quantity,
wherein the deploying step further comprises:
determining the rounding value based on parameters associated with a rounding profile and a planning profile of the planned stock transfer order;
deploying the available products from the at least one source location to each destination location using a plurality of buckets; and
determining a valid means of transport for deploying the buckets;

and further wherein the calculating step comprises calculating the quantity of products available to deploy using the buckets.

14. The program storage device of claim 13, wherein the deploying step further comprises:
considering a period of validity of the means of transport for deploying the buckets from the source location to the destination location.

15. The program storage device of claim 13, wherein the determining step comprises:
determining the valid means of transport in accordance with a transportation duration.

16. The program storage device of claim 13, wherein the creating step is performed at least in part on the basis of the planning profile.

17. The program storage device of claim 13, wherein:
the rounding profile comprises a plurality of rounding values; and
the planning profile comprises a parameter identifying at least one of the rounding values of the rounding profile.

18. A computer-based apparatus for planning a supply network for a product, comprising:
a module configured to create a planned stock transfer order to cover demand from a destination location;
a module configured to deploy available products from a source location to the destination location in response to the planned stock transfer order, wherein the module configured to deploy is further configured to calculate a quantity of products available to deploy based on a rounding value, the rounding value depending on one or more of the available products, the destination location, and a means of transport for deploying the available products; and a module configured to confirm the planned stock transfer order with the calculated available quantity,
wherein the module configured to deploy is further configured to:
determine the rounding value based on parameters associated with a rounding profile and a planning profile of the planned stock transfer order;
deploy the available products from the source location to the destination location using a plurality of buckets;
determine a valid means of transport for deploying the buckets; and
calculate the quantity of products available to deploy using the buckets.

19. The method of claim 1, wherein the calculating further comprises:
calculating the quantity of available products based on a maximum transport size.

20. The system of claim 12, wherein the calculating further comprises:
calculating the quantity of available products based on a maximum transport size.

21. The storage device of claim 13, wherein the calculating further comprises:
calculating the quantity of available products based on a maximum transport size.

22. The apparatus of claim 18, wherein the module configured to calculate is further configured to:
calculate the quantity of available products based on a maximum transport size.

* * * * *